United States Patent [19]
Bazouin et al.

[11] 3,728,368
[45] Apr. 17, 1973

[54] PROCESS FOR THE PREPARATION OF ARYLDIMETHYLCHLOROSILANE

[75] Inventors: Andre Bazouin, Luzinay; Marcel Lefort, Caluire, both of France

[73] Assignee: Rhone-Poulenc S.A., Paris, France

[22] Filed: Apr. 22, 1971

[21] Appl. No.: 136,567

[30] Foreign Application Priority Data

Apr. 23, 1970 France...................................7014777

[52] U.S. Cl.............................................260/448.2 P
[51] Int. Cl...............................C07f 7/08, C07f 7/12
[58] Field of Search.................................260/448.2 P

[56] References Cited

UNITED STATES PATENTS

| | | | |
|---|---|---|---|
| 2,557,782 | 6/1951 | Clark | 260/448.2 P |
| 2,730,540 | 1/1956 | Sauer | 260/448.2 P |
| 2,746,981 | 5/1956 | Wagner et al. | 260/448.2 P |

OTHER PUBLICATIONS

Noll, "Chemistry and Technology of Silicones," Academic Press, N.Y. (1968), p. 58

*Primary Examiner*—Daniel E. Wyman
*Assistant Examiner*—Paul F. Shaver
*Attorney*—Stevens, Davis, Miller & Mosher

[57] ABSTRACT

Aryldimethylchlorosilanes, useful as reactive intermediates in organosilicon chemistry, are prepared by reacting a diaryldimethylsilane with an organochlorosilane $R_{4-n}SiCl_n$, where R is an aliphatic or aromatic hydrocarbon group and $n = 1$ or 2, in the presence of aluminium trichloride.

9 Claims, No Drawings

PROCESS FOR THE PREPARATION OF ARYLDIMETHYLCHLOROSILANE

The present invention relates to a process for the preparation of an aryldimethylchlorosilane by a redistribution reaction between a diaryldimethylsilane and an organochlorosilane.

This redistribution reaction is advantageous because it makes possible conversion, at little cost, of an organosilicon compound of little practical value into another compound of greater practical value. In particular, it is desirable to convert diaryldimethylsilanes, which are, for example, obtained as by-products in the preparation of dimethylphenylchlorosilane by phenylation of dimethyldichlorosilane, into organosilicon compounds possessing reactive chlorine atoms, because these last mentioned compounds are useful for the preparation of polysiloxane oils.

The present invention provides a process for the preparation of an organosilicon compound of the general formula:

in which Ar represents a monovalent aromatic hydrocarbon radical wherein an organosilicon compound of the general formula:

in which the radicals Ar, which may be identical or different, each represent a monovalent aromatic hydrocarbon radical, is reacted, in the presence of aluminium chloride, with an organochlorosilane of the general formula:

$$R_{(4-n)}SiCl_n \quad (III)$$

in which the radicals R, which may be identical or different, each represent monovalent, saturated or unsaturated, hydrocarbon radicals of aliphatic, cycloaliphatic, aromatic or aralkyl nature, and $n$ is 1 or 2.

More particularly, the radical Ar may represent a mononuclear aromatic hydrocarbon radical which may or may not be substituted by alkyl groups or by chlorine atoms, such as the phenyl, chlorophenyl or methylphenyl radicals; and R may represent saturated or unsaturated, straight or branched aliphatic hydrocarbon radicals possessing at most six carbon atoms, such as the methyl, ethyl, propyl, isopropyl, butyl, t.-butyl, vinyl and allyl radicals, or cycloalkyl or cycloalkenyl radicals possessing four to six nuclear carbon atoms, or phenyl radicals or alkylphenyl or phenylalkyl radicals where the alkyl portion contains up to six carbon atoms.

The reaction can be represented as follows:

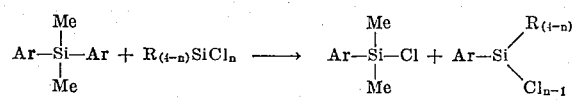

If the initial diaryldimethylsilane possesses different radicals Ar, a mixture of dimethylarylchlorosilanes (I) is, in general, obtained; thus one of the preferred embodiments of the invention involves using "symmetrical" diaryldimethylsilanes (II). Furthermore, if $n$ is equal to 2, the reaction produces two monochlorosilanes and the use of such reactants is preferred because it allows two reactive organosilicon compounds to be obtained.

The reagents (II) and (III) can be used in any desired proportion. In general, an excess of organochlorosilane (III) relative to the stoichiometric requirements of the reaction, as defined above, is added.

The aluminium trichloride can be used in proportions by weight which range from 0.1 to 10 percent and preferably from 0.5 to 5 percent relative to the total weight of organosilicon compounds introduced. Preferably, anhydrous aluminium trichloride stored in the form of coarse blocks and ground finely before use is employed.

The reagents and the catalyst are heated in the liquid phase to a temperature of between 10 and 200°C. and preferably between 20 and 150°C. Several methods of working are possible; for example, the whole of the reagents may be heated to the desired temperature until the reaction is complete, or the organochlorosilane may be introduced gradually into a flask already containing compound (II) and the aluminium trichloride.

At the end of the period of heating, when the reaction is complete (the end of the reaction can be identified by disappearance of the organochlorosilane (III) ), the constituents of the reaction mixture can be separated by any known method, for example, by fractional distillation. The fractions obtained may possibly contain, apart from the required product (I), small amounts of organosilicon compounds of various degrees of chlorination, as well as the diaryldimethylsilane (II) starting material. The pure aryldimethylchlorosilane (I) can be obtained either by a second rectification, or by any known chemical process, such as, for example, that described in French Patent Specification No. 1,466,546. If it is desired to remove the more highly chlorinated impurities, a small amount of phosphoric acid and n-butanol may be added to the mixture; these compounds form complexes with the most highly chlorinated derivatives and so make it possible to isolate the desired product in the pure state by distillation.

In order to avoid carrying aluminium trichloride into the distillates and the possibility of subsequent aluminium trichloride catalysed side-reactions, it is advantageous to complex the catalyst in the final mixture. This can be done by adding a ketone such as acetone, at a temperature of the order of, for example, 20° to 25°C. It is also possible to add an alkali metal halide, such as sodium chloride, to the final mixture and to heat the mixture briefly.

The aryldimethylchlorosilanes (I) are particularly useful in the field of organosilicon chemistry, because of their reactive chlorine atom which enables them to be converted into very many products, amongst which there may be mentioned alkoxysilanes, hydrogenosilanes, aminosilanes, silicon-containing mercaptans and disiloxanes. Furthermore, the aryldimethylchlorosilanes (I) can be employed, optionally

EXAMPLE 1

39.3 g. of diphenyldimethylsilane, 113 g. of dimethyldichlorosilane and 4 g. of aluminium trichloride are introduced into a reaction flask, and maintained at 80°C. for 7½ hours. After cooling, 3 g. of acetone are added and the aluminium chloride-acetone complex is filtered off. Rectification under reduced pressure yields a fraction $F_1$ of boiling point 80°–91°C., at 20 mm pressure weighing 55 g. and containing 85 percent of phenyldimethylchlorosilane (determined by chromatographic analysis).

0.3 g. of phosphoric acid and 4.1 g. of n-butanol are added to fraction $F_1$, heated to 100°C. After distillation under reduced pressure, a pure phenyldimethylchlorosilane fraction is obtained weighing 43 g. of boiling point = 80°–84°C. at 16 mm pressure. The overall yield of phenyldimethylchlorosilane, relative to diphenyldimethylsilane, is 73 percent.

EXAMPLE 2

A mixture of 109 g. of dimethyldiphenylsilane, 116.5 g. of phenylmethyldichlorosilane and 4.6 g. of aluminium trichloride is kept at 100°C. for 6 hours. After cooling, 2.5 g. of acetone are added, the acetone-aluminium chloride complex is filtered off, and the filtrate is distilled to give fractions $F_1$ of boiling point 81.5°–85.8°C., at 1.9 mm pressure weighing 65 g., and containing 75.4 percent of dimethylphenylchlorosilane, and $F_2$ of boiling point 84°–107°C., at 0.3 mm pressure weighing 105 g. and containing 86.4 percent of methyldiphenylchlorosilane. These various fractions are thereafter treated as described in Example 1, to give pure dimethylphenylchlorosilane and pure methyldiphenylchlorosilane.

EXAMPLE 3

A mixture of 106 g. of dimethyldiphenylsilane, 152 g. of diphenyldichlorosilane and 5.1 g. of aluminium trichloride is heated to 90°C. for 5.¼ hours. After cooling, 3 g. of acetone are added, the resulting complex is filtered off, and the filtrate is distilled to give fractions $F_1$ of boiling point = 51°–54°C. at 0.7 mm pressure weighing 57 g. and containing 42.9 percent of dimethylphenylchlorosilane, and $F_3$ of boiling point 164°–166°C. at 1 mm pressure, weighing 85 g. and containing pure triphenylchlorosilane. The phenyldimethylchlorosilane was subsequently isolated from $F_1$ by the procedure described in Example 1.

EXAMPLE 4

A mixture of 170 g. of dimethyldiphenylsilane, 108.7 g. of trimethylchlorosilane and 4.6 g. of aluminium trichloride is heated to 93°C. for 6 hours 40 minutes. After cooling, 3 g. of acetone are added, the resulting complex is filtered off, and the filtrate is distilled under reduced pressure to give fraction $F_1$ of boiling point = 82.8°–94°C., at 30 mm pressure weighing 116.5 g. and containing 55 percent of phenyldimethylchlorosilane and 39.8 percent of phenyltrimethylsilane. Rectification of fraction $F_1$ gives fractions $F_1'$ of boiling point = 56°–57°C. at 16 mm pressure weighing 43 g. and containing pure phenyltrimethylsilane, and $F_2'$ of boiling point = 82°–85°C., at 16 mm pressure, weighing 61 g. and containing pure phenyldimethylchlorosilane.

EXAMPLE 5

A mixture of 113.2 g. of dimethyltolylphenylsilane, 129.1 g. of dimethyldichlorosilane and 4.8 g. of aluminium trichloride is heated to 87°–88°C. for 5 hours. After cooling to about 25°C., 3 g. of acetone are added, the resulting complex is filtered off, and the filtrate is distilled to give a fraction of boiling point = 85° – 112°C., at 26 mm pressure weighing 82 g. and containing 47 percent of dimethyltolylchlorosilane and 43 percent of phenyldimethylchlorosilane. A second rectification gives pure dimethyltolylchlorosilane and pure phenyldimethylchlorosilane.

We claim:

1. A process for the preparation of an aryldimethylchlorosilane of the general formula

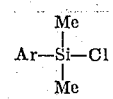

in which Ar represents a monovalent aromatic hydrocarbon radical, wherein a diaryldimethylsilane of the general formula

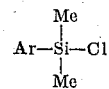

in which the radicals Ar, which may be identical or different, each represent a monovalent aromatic hydrocarbon radical, is reacted in the liquid phase at a temperature of between 20° and 150°C, in the presence of aluminium trichloride, with an organochlorosilane of the general formula

in which the symbols R, which may be identical or different, each represent a saturated or unsaturated, monovalent, hydrocarbon radical of aliphatic, cycloaliphatic, aromatic or aralkyl nature, and $n$ is 1 or 2.

2. A process according to claim 1 wherein Ar represents an unsubstituted mononuclear hydrocarbon radical or a mononuclear hydrocarbon radical substituted by alkyl groups or chlorine atoms.

3. A process according to claim 2 wherein each Ar group in the diaryldimethylsilane is identical.

4. A process according to claim 1 wherein R represents a saturated or unsaturated straight or branched chain aliphatic hydrocarbon radical containing up to six carbon atoms or a cycloalkyl or cycloalkenyl radical containing four to six ring carbon atoms or a phenyl, phenylalkyl or alkylphenyl radical.

5. A process according to claim 1 wherein $n = 2$.

6. A process according to claim 1 wherein aluminium trichloride is present in an amount of 0.1 – 10 percent by weight based on the total weight of organosilicon reactants.

7. A process according to claim 1 wherein after the reaction is completed a ketone is added to the reaction mixture to complex with the aluminium trichloride.

8. A process according to claim 1 wherein after the reaction is completed, phosphoric acid and butanol is added to the reaction mixture to complex any highly chlorinated derivatives.

9. A process according to claim 1 wherein a diaryldimethylsilane selected from the group consisting of diphenyldimethylsilane and dimethyltolylphenylsilane is reacted with an organochlorosilane selected from the group consisting of dimethyldichlorosilane, phenylmethyldichlorosilane, diphenyldichlorosilane and trimethylchlorosilane in the liquid phase at 20° – 150°C. in the presence of 0.5 – 5 percent by weight aluminium trichloride based on the combined weight of diaryldimethylsilane and organochlorosilane, acetone is added to the reaction mixture after completion of the reaction, the resulting acetone/aluminium trichloride complex is removed from the reaction mixture, phosphoric acid and n-butanol added to the reaction mixture and the reaction mixture thereafter distilled to give the aryldimethylchlorosilane as a distillate.

* * * * *